Figure 1:
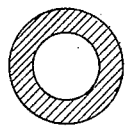

(No Model.)

S. Z. DE FERRANTI.
DISTRIBUTION OF ELECTRICAL ENERGY.

No. 409,182. Patented Aug. 20, 1889.

Witnesses:
Edward C. Davidson.
M. J. Kelley.

Inventor:
S. Z. de Ferranti
by his Attorneys
Baldwin, Davidson & Wight

UNITED STATES PATENT OFFICE.

SEBASTIAN ZIANI DE FERRANTI, OF HAMPSTEAD, COUNTY OF MIDDLESEX, ENGLAND.

DISTRIBUTION OF ELECTRICAL ENERGY.

SPECIFICATION forming part of Letters Patent No. 409,182, dated August 20, 1889.

Application filed February 19, 1889. Serial No. 300,456. (No model.) Patented in England December 11, 1885, No. 15,251; in France December 9, 1886, No. 180,176; in Belgium January 8, 1887, No. 75,875, and in Italy March 31, 1887, No. 21,119.

*To all whom it may concern:*

Be it known that I, SEBASTIAN ZIANI DE FERRANTI, electrician, a subject of the Queen of Great Britain, residing at 120 Fellows Road, Hampstead, in the county of Middlesex, England, have invented certain new and useful Improvements in the Distribution of Electrical Energy, (for which I have received Letters Patent in Great Britain, No. 15,251, dated December 11, 1885; in France, No. 180,176, dated December 9, 1886; in Belgium, No. 75,875, dated January 8, 1887, and in Italy, No. 21,119, dated March 31, 1887,) of which the following is a specification.

For conveying alternating electrical currents to long distances from a dynamo-electrical machine by which the alternating current is generated it is essential, if the current is to be distributed with economy, to use currents of very high tension, as otherwise the cost of providing an insulated conductor of sufficiently large dimensions would be excessive. To still further reduce the cost of the insulated conductor, I make the conductors in the form of tubes. This I do both for electrical and mechanical reasons.

It was well known at an early date that statical electricity was stored upon the surfaces of insulated conductors. It was also next known that when a current of voltaic electricity began to flow it traveled evenly through the whole section of a conductor. With an alternating current the current does not travel on the surface of a conductor, nor does it travel equally through its section, but the bulk of the current travels through the outer part of the section of the conductor as it is repelled by itself. Thus a rod one inch in diameter with a powerful current flowing through it will take almost the whole of the current through a section between a circle three-fourths of an inch in diameter and the outer circumference of the copper rod. Thus only one-eighth of an inch from the circumference is of real use in proportion to its cost. It is thus desirable that the conductor should be of thin metal, and for the sake of convenience it is desirable that the thin metal should be in the form of a tube, as in this form it is not only more readily insulated, but also because two lengths of tubular conductor can with ease be coupled up without decrease of conducting power or material increase of diameter at the joint, and without interfering with the insulating material by which the conductor is surrounded. To obtain safety in working, I may use, as described in another application for patent made by me bearing even date herewith, and numbered serially 300,458, and as shown in my application, Serial No. 286,208, filed September 24, 1888, two tubular conductors one within the other and with insulation between them. The inner conductor I couple to one pole of the generator and the outer conductor to the other. The outer conductor I may also maintain in free electrical connection with the earth, so as to be of the same electrical potential. It is not, however, essential that the tubular conductors should be concentric one within the other. Part of the advantage derivable from the use of tubular conductors with electrical generators generating alternating currents may be obtained by the use of two separate insulated tubular conductors for conveying the current to and from the generator, or even by the use of a single insulated tubular conductor leading from the generator.

Figure 2:
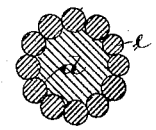
Figure 5:
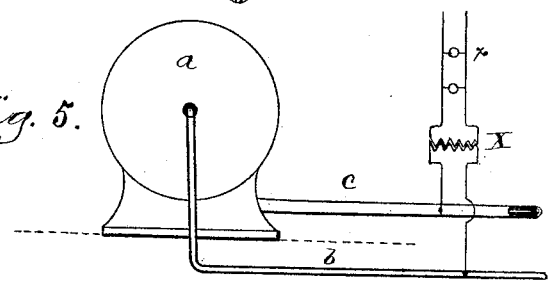
Figure 4:
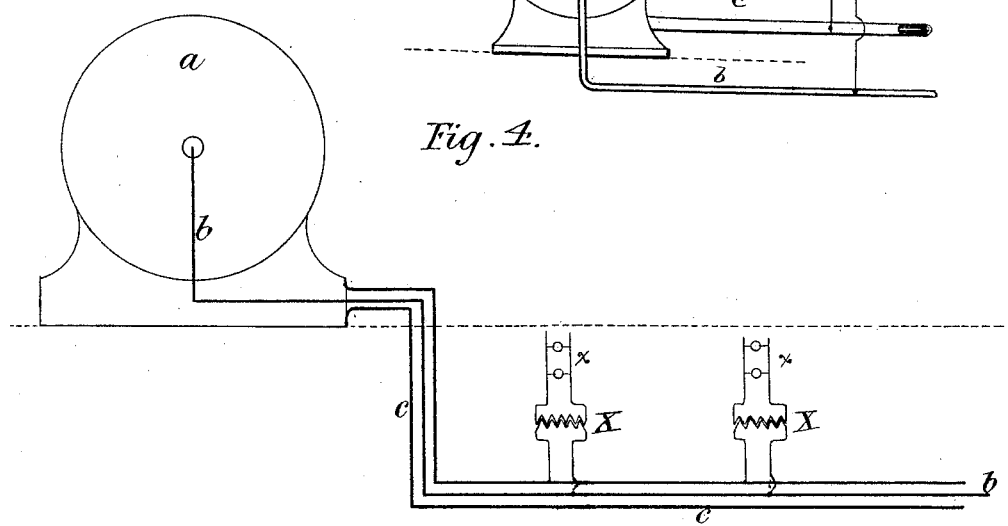
Figure 3:

In the drawings annexed, Figure 1 is a transverse section of a single tubular conductor. Fig. 2 is a modification of this conductor, showing how it may be made of a number of separate wires ranged around a central core. Fig. 3 is a longitudinal section of two concentric conductors insulated from one another. Fig. 4 is a diagram view of an electric generator for generating alternating currents and concentric tubular conductors separated by insulated material leading from it, as above described; Fig. 5, a similar view showing separated tubular conductors leading from the generator.

*a* is the dynamo, and *b c* the tubular conductors leading therefrom to wherever the current is to be utilized.

In Fig. 2 a central core *d*, surrounded by a number of small conductors *e*, is shown as another way of making a tubular conductor.

In Fig. 4 concentric tubular conductors $b$ $c$, leading from the dynamo $a$, are shown. In Fig. 5 the tubular conductors are separated.

The organization described was designed by me for use in my system of lighting by alternating currents and converters described and shown in my British Patent No. 15,251, of 1885, above mentioned. In the drawings, X represents translating devices consisting of converters in multiple or cross-connection between the tubular leads of the dynamo and lamps $x$ in the secondary circuits of the converters.

I claim as my invention—

In a system of distribution of electric currents, the combination, substantially as and for the purpose set forth, of an alternating-current dynamo generating high-tension alternating currents, leads or main distributing-conductors connected with the poles of the dynamo, one or both of said conductors being tubular, said conductors being arranged in proximity, and translating devices connected in multiple between said conductors.

SEBASTIAN ZIANI DE FERRANTI.

Witnesses:
HERBERT E. DALE,
GEO. J. B. FRANKLIN,
*Both of 17 Gracechurch Street, London, E. C.*